United States Patent [19]

Nichols

[11] Patent Number: 5,029,734
[45] Date of Patent: Jul. 9, 1991

[54] COMPOSITE CONTAINER

[75] Inventor: Dwight E. Nichols, Beatrice, Nebr.

[73] Assignee: Hoover Group, Inc., Alpharetta, Ga.

[21] Appl. No.: 411,629

[22] Filed: Sep. 22, 1989

[51] Int. Cl.⁵ .............................................. B65D 35/56
[52] U.S. Cl. .................................... 222/105; 108/55.3; 206/386; 206/600
[58] Field of Search ................. 222/105, 518; 206/600, 206/386; 251/354, 360; 108/55.1, 55.5, 53.1, 55.3, 56.1

[56] References Cited

U.S. PATENT DOCUMENTS

| | | | |
|---|---|---|---|
| 2,692,112 | 10/1954 | Szitar, Jr. | 251/354 X |
| 3,540,636 | 11/1970 | Dvoracek | 222/518 X |
| 3,746,305 | 7/1973 | Zakka | 251/360 |
| 4,165,024 | 8/1979 | Oswalt | 222/105 |
| 4,281,779 | 8/1981 | Shepard | 222/518 X |
| 4,453,471 | 6/1984 | Harrington et al. | 108/56.1 X |
| 4,524,800 | 6/1985 | Holland | 251/354 X |
| 4,609,116 | 9/1986 | Simms | 206/600 X |
| 4,666,059 | 5/1987 | Nordstrom | 222/105 X |
| 4,765,252 | 8/1988 | Shuert | 206/600 X |
| 4,856,657 | 8/1989 | Shuert | 206/600 |

Primary Examiner—Michael S. Huppert
Assistant Examiner—Gregory L. Huson
Attorney, Agent, or Firm—Harness, Dickey & Pierce

[57] ABSTRACT

A composite container which consists of a reusable pallet, a thin walled plastic tank and a reinforcing cardboard shell maintaining the tank in an upright position on the pallet. Plastic clips connect the shell to the pallet and enable easy assembly and disassembly of the container. Additionally, a dry break valve is incorporated in the container so as to prevent material leakage and enable easy discharge of the tank contents on an intermittent basis.

8 Claims, 3 Drawing Sheets

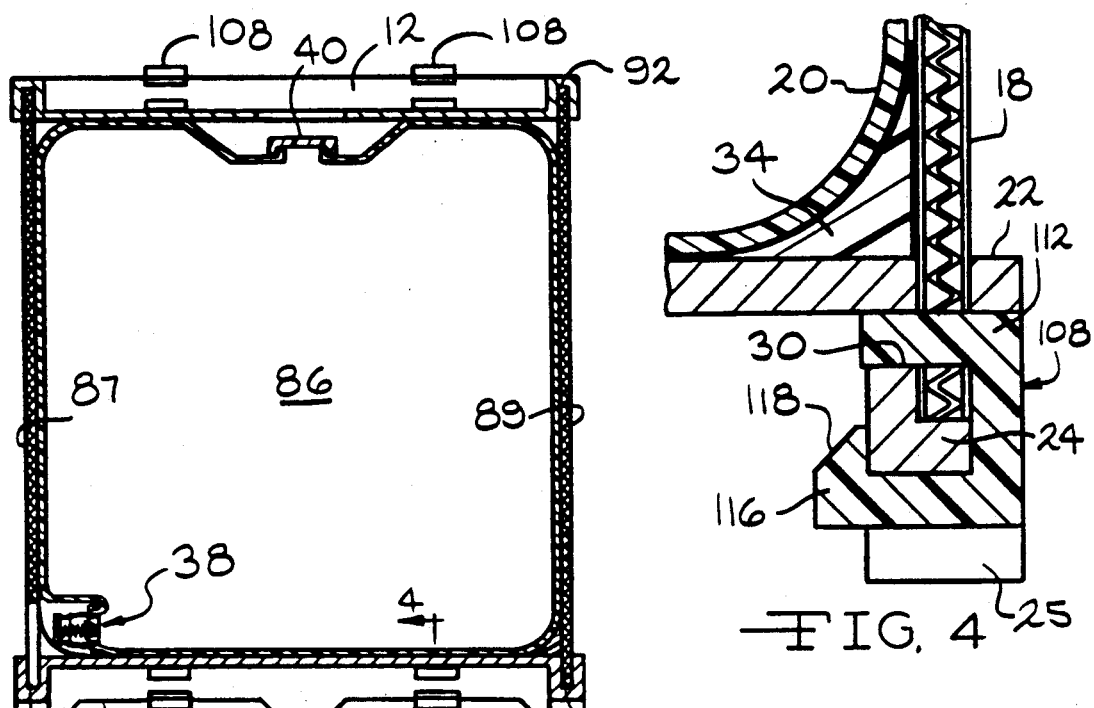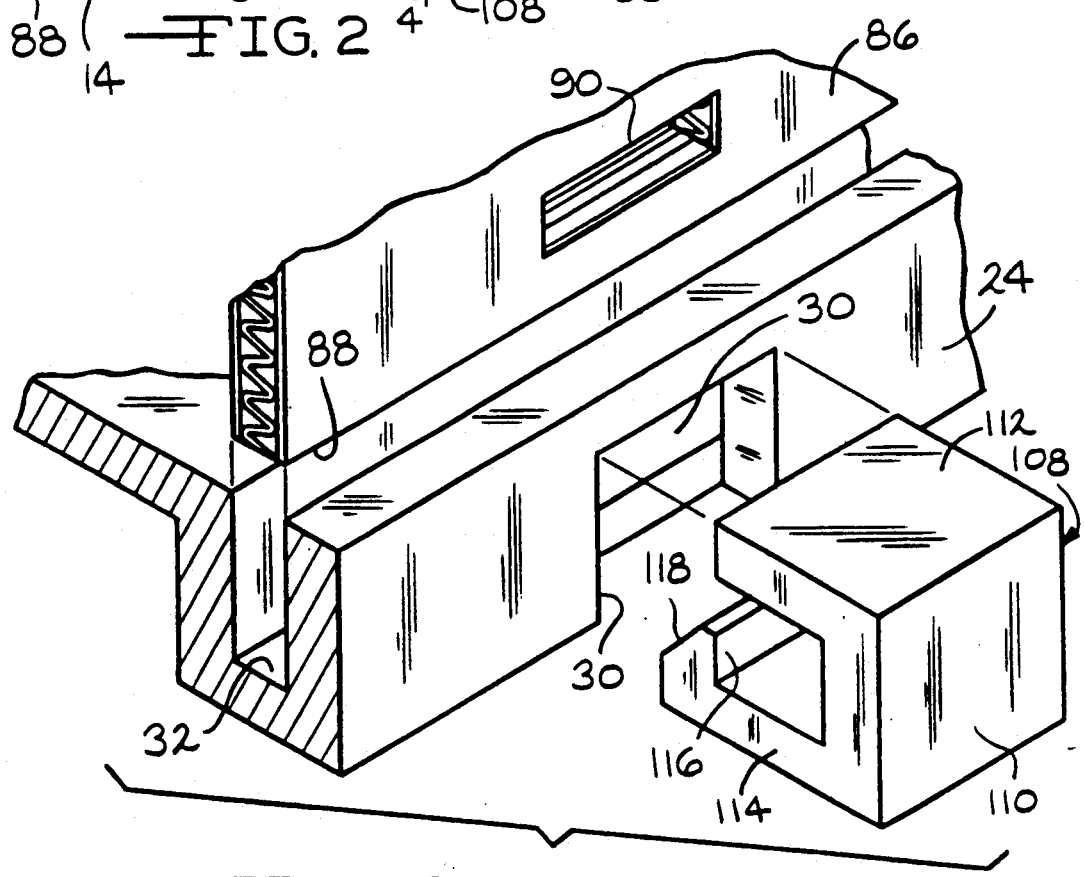

COMPOSITE CONTAINER

BACKGROUND AND SUMMARY OF THE INVENTION

This invention relates to shipping and storage containers and more particularly to containers in which the base serves as a reusable pallet and which further has an independent top and bottom thereof.

Containers are used in a wide variety of applications requiring the storage and transportation of industrial goods. Many previous container designs employed wooden pallets which served as supporting members for these goods. The use of these pallets had several drawbacks, however, as the pallets required much valuable warehouse space, were subject to relatively easy breakage, and were not reusable over a relatively long period of time.

Improvements in container designs have been made and one such improvement is shown in U.S. Pat. No. 4,550,830. This patent discloses a reusable pallet and a sleeve in the form of a cardboard box open at its lower end. A plurality of foldable tabs are integrally formed along the bottom edge of the sleeve. These tabs co-operate with the pallet so as to pass therethrough and be folded underneath the pallet so as to hold the sleeve, the pallet, and a top in assembly relation thereby forming a container. Other composite containers are shown in U.S. Pat. Nos. 4,648,521 and 4,793,519 owned by the assignee of this application.

The pallet is preferably formed with a peripheral groove lying substantially at floor level to receive the edge of the sleeve in order that compressive forces applied to the container be transferred by the container to the floor. While improving over the wooden pallet design, the use of the tabs for connecting the pallet and sleeve can be improved on.

According to the present invention, a container is provided which employs a reusable pallet having a sidewall member having a plurality of openings therein, adjacent the bottom periphery thereof. The sidewall member and the pallet co-operate to define a recessed groove portion around the periphery of the pallet which at its upper end is raised above the surface upon which the pallet is placed. A sleeve in the form of an open bottom cardboard box is disposed within the defined groove portion, the sleeve having openings therein in communication with the openings of the sidewall portion.

A removable retainer clip is removeably extended through each of said openings and through the associated communicating sleeve opening while encircling the bottom of the sidewall member so as to securely lock the sleeve within the groove. Additionally, a plastic top portion is fitted over the top portion of the sleeve in substantially the same manner as the sleeve was fitted within the defined groove.

A dry break valve is also disclosed for use with a blow molded tank which is retained within the sleeve upon the pallet. The dry break valve insures that flow of material from within the tank will be discontinued immediately when the valve is closed.

These and other aspects, features, advantages, and objects of this invention will be more readily understood upon reviewing carefully the following detained description in conjunction with the accompanying drawings and appended claims.

BRIEF DESCRIPTION OF THE DRAWINGS

For a more complete understanding of the present invention relative to the advantages thereof, reference is now made to the following description taken in conjunction with the accompanying drawings. In describing the overall invention, reference will be made to the accompanying drawings wherein like numerals in the various figures refer to the same or similar elements or features and in which:

FIG. 2 is a vertical sectional view of the composite container of this invention taken substantially along the line 2—2 of FIG. 1;

FIG. 3 is a fragmentary exploded perspective view showing the assembly relationship of the sleeve, pallet, and retainer clip in a container made in accordance with the teachings of the preferred embodiment of this invention;

FIG. 4 is an enlarged sectional view taken substantially along the line 4—4 of FIG. 2;

DETAILED DESCRIPTION OF THE INVENTION

Figure 1:
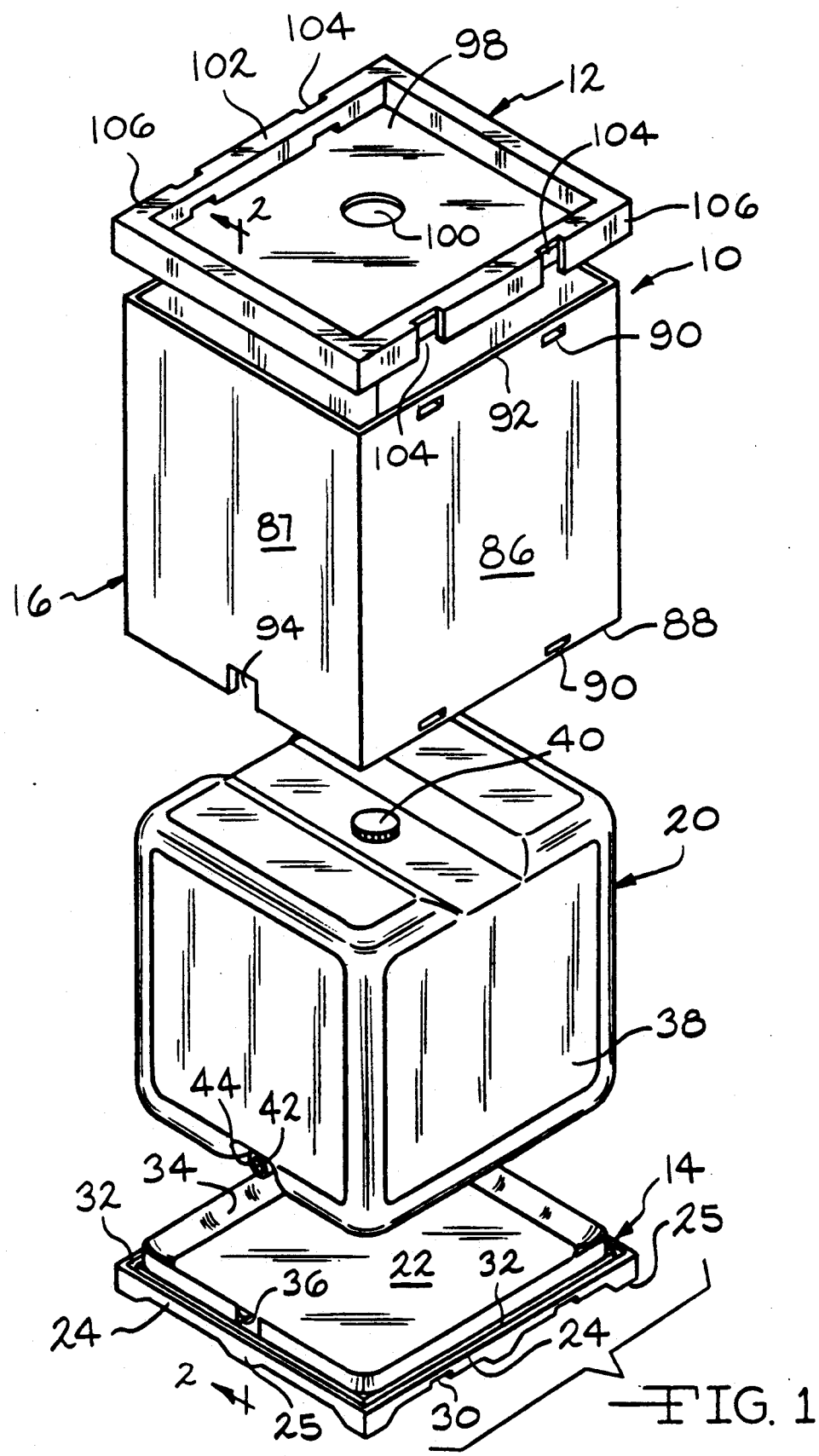
FIG. 1 is an exploded perspective view showing the assembly relationship of the components of a container made in accordance with the teachings of the preferred embodiment of this invention.

Referring now to FIG. 1, there is shown a composite container 10 made in accordance with the teachings of the preferred embodiment of this invention and including a substantially square shaped top or cover member 12, a substantially square shaped pallet 14, a sleeve member 16 in the form of a cardboard box of rectangular shape, and a blow molded plastic tank 20 having thin walls.

Specifically as shown best in FIGS. 1 and 3, the pallet 14 comprises a plastic body having flat support portion 22 bounded by a depending sidewall member 24. Spaced support feet 25 are formed on sidewall member 24 at equi-distant locations therearound so that the container 10 can be supported on a floor or other surface and handled with fork lift or other apparatus. The sidewall member 24 further contains a plurality of rectangularly shaped side openings 30 on the outer surface thereof. A recessed groove 32 is formed around the periphery of pallet 22 at a position extending downwardly into sidewall member 24 in communication with the openings 30.

The pallet 22 also has an upwardly flanged cup shaped tank retention projection 34 having an opening 36 for the tank discharge. The pallet 22 and the projection 34 may be constructed of a variety of materials but, in the preferred embodiment of this invention, are manufactured of a thermo-formed plastic material.

The tank 20 is a generally cubic shape hollow body 38 into which a volume of flowable liquid material (not shown) is placed. In the preferred embodiment of this invention, tank 20 is manufactured by the standard technique of blow molding polyethylene. Tank 20 also contains a top inlet (not shown) in communication with the interior of body 38. The inlet is used to fill the body 38 with flowable material following which the inlet is closed by a readily removable closure 40.

Tank 20 further contains a dry break valve body 42 (shown best in FIGS. 1 and 5) which provides communication between the contained flowable material (not shown) and the exterior of tank 20 by means of an outlet opening 44 which is circumscribed by a plurality of internal threads 46 on the interior surface of valve body 42.

Figure 5:
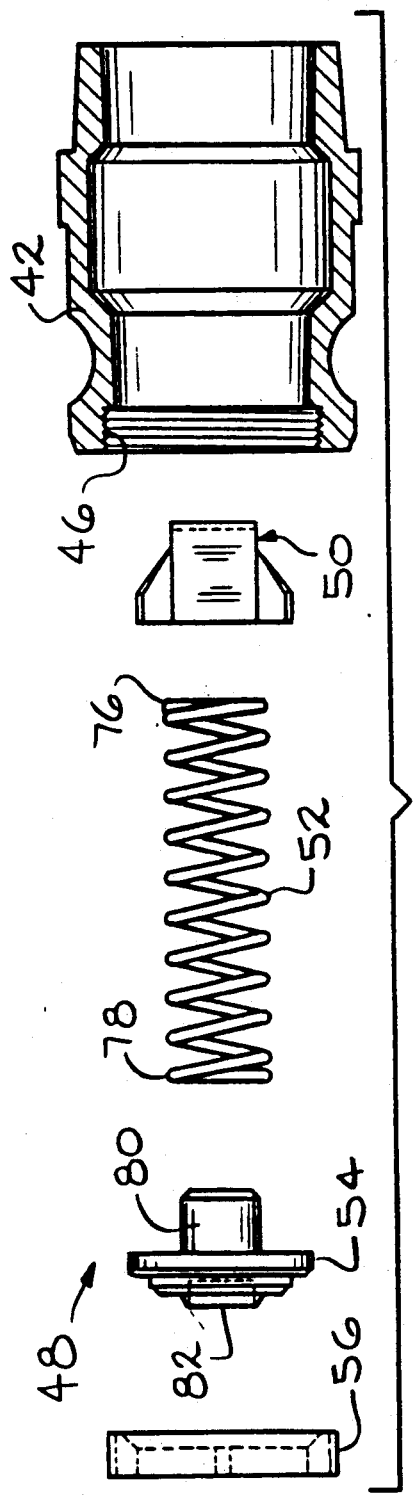
FIG. 5 is an exploded elevational and sectional view of the components associated with a dry break valve in the container of this invention.
Figure 7:
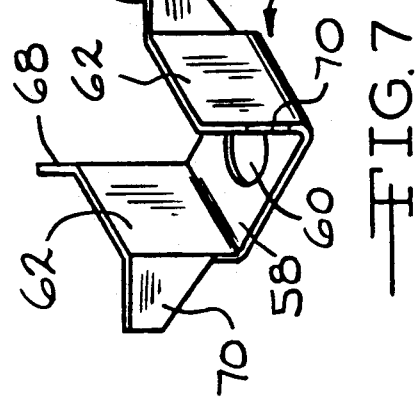
FIG. 7 is a perspective view of the spring retainer portion of the dry break valve shown in FIGS. 5 and 6.
Figure 6:
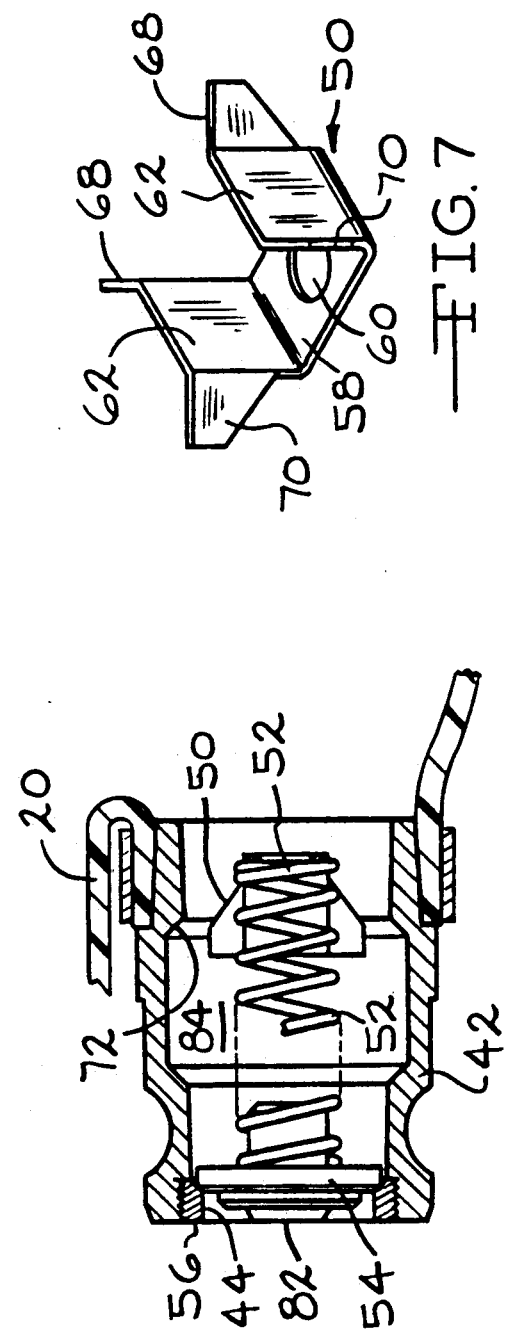
FIG. 6 is a vertical sectional view of the dry break valve of FIG. 5 shown in assembly relation with the tank forming part of the composite container of this invention.

As shown best in FIGS. 5-7, a dry break valve assembly 48 is disposed within valve 42 and comprises a spring retention member 50, a spring 52, a depressible poppet member 54, and a removable threaded insert 56.

Retention member 50 consists of a unitary irregularly shaped body having a flat plate portion 58 formed with a central orifice 66 and having side wing portions 62 which are perpendicular to plate portion 58. Each side portion 62 is integral with opposite portions 68 and 70 which extend angularly outward relative to the supporting sidewing portion 62.

The retention member 50, in the preferred embodiment of this invention, is disposed within valve 42 such that orifice 60 is in direct communication with outlet 44. This location is accomplished by positioning angle portions 68 and 70 on an interior shoulder 72 in valve body 42 as shown in FIG. 6.

Spring 52 is a standard compressible spring and is of a diameter such that it can be positioned at one end 76 between the side portions 62 of retention member 50 in the manner illustrated in FIG. 6. The opposite end 78 of spring 52 is wrapped around a horizontally extending projection 80 on poppet 54 and is moveable from an extended partially compressed position as shown in FIG. 6 to a more compressed "valve open" position (not shown).

Poppet 54 has an end face 82 which defines an area large enough to cover outlet opening 44. As shown in FIG. 6, poppet 54 is normally biased into a fluid stoppage position by the co-operation of spring 52 and shoulder 72.

In this stoppage position, communication is prevented between the material (not shown) in tank 20 and outlet opening 44. Poppet 54 is moveable to a depressed or valve open position (further within the body of valve 42) by the application of depressing force to face 82. When enough force is applied to face 82 to overcome the force of the spring 52, the poppet 54 is moved into an internal chamber 84 within valve body 42.

In this position, the valve is open and material can flow from tank 20 to outlet 44 as the material will now flow around poppet 54 through the chamber 84 and exiting therefrom through outlet 44. If the depressing force applied to face 82 is removed, spring 52 will move the poppet 54 back to an operable stoppage position as shown in FIG. 6. Thus, an interruption or breakage of contact between poppet 54 and a valve opening member (not shown) will not result in spillage of the tank contents because the valve 48 will automatically close. Threaded insert 56 is provided to support poppet 54 so that poppet 54 may not be accidentally depressed in a manner that would cause material flow from outlet 44.

As shown in FIG. 1, the tank 20 is peripherally supported by sleeve 16 which is telescoped over the tank 20. Specifically, sleeve 16 has rectangular flat side walls 86, a front wall 87 and a back wall 89, each having a horizontal bottom edge 88 adapted to be placed within groove 32 so as to support the sleeve 16 on the pallet 14. In the preferred embodiment of the invention, sleeve 16 is made of corrugated cardboard.

As shown best in FIGS. 1 and 3, each sidewall 86 has a plurality of rectangular openings 90 therein, said openings 90 being disposed adjacent horizontal top and bottom edges 92 and 88, respectively of the sidewall. A centrally located opening 94 in the front wall 87 is aligned with the tank discharge opening 44.

As further shown in FIG. 1, container 10 also includes a top or cover 12 preferably manufactured of thermo-formed plastic and defining a flat depressed inner portion 98 having a central opening 100. A thick peripheral ridge 102 extending around the cover periphery has a plurality of openings 104 on sides 106 that are aligned with side walls 86.

As shown best in FIGS. 3 and 4, the container 10 is maintained in assembled condition by a plurality of locking clips 108 preferably formed of a yieldable plastic material. Each clip 108 has an upright outer wall 110 to which horizontal finger members 112 and 114 are connected. The lower finger 114 terminates at its inner end in a vertical flange 116 which extends upwardly and ends in a spaced relation with upper finger 112. The outer side of flange 116 terminates in a beveled face 118 for a purpose to appear presently.

The clip 108 is constructed so that the finger 112 can be inserted into one of the pallet openings 30 and through a sidewall of opening 90 aligned with opening 30 while lower edge 88 of sidewall 86 is supportively nested within pallet groove 32. The beveled face 118 of finger 114 engages a surface 122 on the bottom portion of sidewall member 24 inwardly of the opening 30 so that the flange 116 is deflected downwardly below the sidewall 24 until it has cleared the sidewall. The flange 116 then springs upwardly to the locking position shown in FIG. 4.

In operation, top 40 is twistably lifted from tank 20 and flowable material (not shown) is placed within body 38. Top 40 is then returned to its closure position, as shown in FIG. 1, and tank 20 is placed upon support portion 22 of pallet 14 such that discharge 44 is placed within recess 36 and extends forwardly therefrom. The tank 20 is then nested in retention projection 34. Sleeve 18 is then telescoped downwardly over the tank 20 and extended into groove 32 such that each opening 90 adjacent lower edge 88 is in direct communication with a pallet opening 30. A locking clip 108 is then inserted into every opening 30 such that finger 112 thereof extends through an opening 90 and the bottom edge of the sleeve 16 is nested within groove 32 wherein finger portion 116 of clip 108 simultaneously is locked against the inner side of the sidewall 24 of pallet 14. In this manner, the sleeve 16 is securely connected to pallet 14 so as to retain the tank 20 in an upright position on the pallet.

The cover 12 is then positioned over the top end of sleeve 16 and is secured by clips 108, turned upside down relative to the position shown in FIGS. 3 and 4, to the upper edge 92 of the sleeve 16. In this assembly, opening 100 is aligned with the tank closure 40 so that the tank 20 can be filled through the opening 100 after the cover 12 is installed. The container 10 is readily discharged through dry break valve body 42 and sleeve opening 94 by actuation of the dry break valve poppet 54.

Should it be desired to remove tank 20 from container 10, clips 108 are first removed and sleeve 16 together with top 12 are removed exposing tank 20. Thusly, based upon the aforementioned discussion it should be apparent to one skilled in the art that container 10 is relatively easy to assemble or to disassemble and that the repeated insertion or removal of clips 108 therefrom will have little effect upon the wear of the same thus increasing the total useable life of container 10. Further, container 10 may be stacked in a relatively small warehouse space and contains elements including a pallet which may be repeatedly used.

It is to be understood that the invention is not to be limited to the exact construction or method illustrated and described above, but that various changes and modifications may be made without departing from the spirit and scope of the invention as defined in the following claims.

What is claimed is:

1. A composite container comprising:
    a pallet having a substantially flat top support portion bounded by a depending sidewall member terminating at its lower end in a plurality of spaced support legs, means on said pallet forming a sleeve reception groove around said top support portion and extending downwardly into said sidewall member, means forming side openings in said sidewall at positions intersecting and in communication with said groove in said sidewall member;
    a tank supported on said pallet top portion, an upright sleeve telescoped over said tank and extending downwardly into said pallet sidewall groove, said sleeve having openings therein positioned in substantial alignment with said pallet sidewall openings, and
    a plurality of locking clips extending through said aligned sleeve and pallet openings and releasably engaged with said pallet sidewall so as to removably maintain said sleeve in a retained upright position on said pallet and extending into said reception groove, said locking clips corresponding in number to the number of said aligned openings in said pallet sidewall and said sleeve, each of said clips being positioned on the outer side of said sidewall and having a locking portion extending through said aligned openings, said clip also having a retaining portion extending transversely of the sidewall at a position between a pair of said legs and being releasably engaged with the inner side of said sidewall.

2. The container of claim 1 wherein said sleeve is formed of corrugated cardboard.

3. The container of claim 1 further comprising:
    a plastic top member connected to said sleeve to enclose said tank, said tank having an inlet opening formed therein enclosed by said plastic top member.

4. The container of claim 1 wherein said tank has a discharge opening at its lower end, and said pallet and sleeve have aligned openings aligned with said tank discharge opening.

5. The container of claim 4 further including valve apparatus operatively associated with said discharge opening, said valve apparatus comprising a hollow tubular body mounted in fluid communication with said tank and defining an outlet opening at one end thereof, said body containing a spring retainer attached therein; a spring having an end attached to said spring retainer; and depressible poppet means connected to an end of said spring opposite said end connected to said spring retainer, said poppet means being disposed within said body and covering said discharge outlet opening for movement between a normal closed position and a depressed open position enabling flow of liquid from said tank through said discharge opening.

6. The container of claim 5 wherein said hollow body includes internal threads at said outlet opening and a poppet retainer threaded into said outlet opening.

7. A container comprising:
    a reusable pallet having a flat support portion and further having a sidewall member around the periphery thereof, said sidewall member defining a plurality of pallet support members engaging a surface and supporting said pallet thereabove, said sidewall member further having a plurality of openings therein and co-operating with said flat support portion to define a recessed sleeve reception groove around said pallet and above said surface, said groove being intersected by and being in communication with said openings in said sidewall member;
    a sleeve having a horizontal bottom portion operatively disposed within said groove and further having a plurality of openings therein, each of said openings being in communication with one of said openings of said sidewall member;
    an engagement clip comprising a one piece body member having an upright connecting portion and having a substantially horizontal sleeve retaining portion and a horizontal sidewall engaging locking portion connected to said upright connecting portion at opposite ends thereof wherein said locking portion has an angled support portion at a free end thereof, said support portion being disposed around a bottom portion of said sidewall member and supportively engaging the same wherein said horizontal sleeve retaining portion is disposed within said opening of said sidewall portion and supportively communicating with one of said openings of said sleeve.

8. The container of claim 7 further including:
    a plurality of said locking clips corresponding in number to the number of said aligned openings in said pallet sidewall and said sleeve, each of said clips being positioned on the outer side of said sidewall and being formed of a yieldable plastic material to enable said locking portion to snap over said sidewall on engagement by said angled support portion.

* * * * *